(12) United States Patent
Johnson et al.

(10) Patent No.: US 8,550,755 B2
(45) Date of Patent: Oct. 8, 2013

(54) TAP DRIVER FOR RIGID/SYNCHRONOUS TAPPING

(75) Inventors: Mark F. Johnson, Harrison, ID (US);
Allan S. Johnson, Harrison, ID (US)

(73) Assignee: The Tapmatic Corporation, Post Falls, ID (US)

( * ) Notice: Subject to any disclaimer, the term of this patent is extended or adjusted under 35 U.S.C. 154(b) by 349 days.

(21) Appl. No.: 13/134,800

(22) Filed: Jun. 17, 2011

(65) Prior Publication Data

US 2012/0321401 A1 Dec. 20, 2012

(51) Int. Cl.
*B23G 1/46* (2006.01)
(52) U.S. Cl.
CPC ........................................ *B23G 1/46* (2013.01)
USPC ............ 408/141; 408/56; 408/239 R; 279/16; 470/198

(58) Field of Classification Search
USPC ......... 408/56, 57, 127, 141, 215, 238, 239 A, 408/239 R; 279/16, 20; 470/198, 207
IPC .......................................................... B23G 1/46
See application file for complete search history.

(56) References Cited

U.S. PATENT DOCUMENTS

| | | | | |
|---|---|---|---|---|
| 4,080,090 | A | * | 3/1978 | Kern ................................ 408/59 |
| 6,569,022 | B2 | * | 5/2003 | Johnson et al. .................. 470/96 |
| 2006/0285933 | A1 | * | 12/2006 | Johnson et al. ............... 408/141 |

* cited by examiner

*Primary Examiner* — Daniel Howell
*Assistant Examiner* — Alan Snyder
(74) *Attorney, Agent, or Firm* — Wells St. John PS (57) ABSTRACT

Disclosed is a tap driver and tap driver system for rigid tapping, which includes a unique flexure system. In some embodiments, an integrated flexure component and housing configuration provides and may provide both a more economical and a universal configuration of the tap driver flexure component that allows the central body to be integrated with and into different types of tap drivers.

9 Claims, 9 Drawing Sheets

TAP DRIVER FOR RIGID/SYNCHRONOUS TAPPING

CROSS REFERENCE TO RELATED APPLICATION

This application does not claim priority from any other application.

TECHNICAL FIELD

This invention pertains to a tap driver for rigid or synchronous tapping, including providing a universal flexure component which may be integral with the central portion of the body.

BACKGROUND OF THE INVENTION

In machining metallic work pieces, an apparatus called a tap is used to create internally threaded holes for receiving screws in the metallic work pieces. The tap itself is a tool with external cutting threads. In order to create the internally threaded hole in the work piece, the tap is rotated and driven into the work piece to the desired hole depth, and then reverse rotated and retracted from the work piece. The tap is generally held by a tap driver, and the tap driver is held or secured within a machine which provides the forward and reverse rotation as well as the forward and reverse drive.

In creating the internally threaded hole, the tap driver is first rotated and driven into the base material or metal to the desired depth. Once the tap reaches the desired depth, the rotation of the tap driver and the tap is reversed and the tap is retracted from the base material. In order to create the best internally threaded hole, the tap should be simultaneously advanced and rotated at precisely correlated rates of rotation and forward movement for a given tap pitch. By way of example, a one-quarter-twenty tap should be advanced into the work piece one inch for every twenty revolutions, or 0.05 inch for each revolution. In typical rigid tapping, the driver machines provide the synchronization of the spindle rotation and feed advance to match the tap pitch.

During the creation of a tap hole, the machine spindle goes through several stages, namely driving the rotating tap into the tap hole, slowing the forward drive or feed rate and the rotation until the tap comes to a stop in the work piece, reversing the direction of the rotation and accelerating or increasing the reverse rate of rotation to match the desired tap pitch as the tap is retracted. It will be appreciated by those of ordinary skill in the art that during the changes in rotation speed, the feed advance of the tap must be adjusted or correlated to precisely match the tap pitch. However, in practice it is very difficult to precisely match the rotation, drive and tap pitch and there are small errors that occur in the synchronization of the rotation speed and the feed rate during the deceleration or slowing down phase, and during the reverse rotation acceleration phase.

For many decades and back to the early 1900's, tension/compression tap drivers were used in production applications such as on transfer or assembly lines in the tapping or cutting of internally threaded holes in parts. These prior tension/compression devices required what the industry views as substantial movability in the tapping attachments because the tapping attachments would generally be utilized for multiple tap sizes and varying hole positions on different and irregular work surfaces. The old conventional machines and even the prior computer controlled machines utilized before rigid tapping was developed in the 1980's, required the springy tension/compression tapping attachments in order to produce good threads.

Around 1982, synchronous feed or rigid tap and control was invented and developed, and by approximately 1992 the computer programmed and CNC machines became widely used in industry, including for tapping. The precision and accuracy of the newly developed CNC machines changed the tapping industry by providing much more precise control over the entire tapping process and tool movement than the older tension/compression tapping attachments. It provided an improved way of tapping compared to the older tension/compression tapping attachments. The new CNC machines provided more precise movement of the tapping attachments and tools to the desired locations, more precise controls over the speed and rotation of the tapping attachments and tapping tools, and the changing of tapping tools utilized.

The industry soon recognized that the new use of rigid or synchronous tapping via CNC machines outperformed the older methods in several ways. For example, the speed at which the tapping occurred could be optimized for the particular tap, tap size and material being cut, versus the old method and tools wherein the tension/compression tapping attachments needed to be used because generally one slow speed was used for all taps in a multi-spindle tapping application. In another example, the new CNC machines provide a more accurate depth control, which can be important in tapping.

Due to the sophistication and precise performance capabilities of the newer CNC machines, the industry originally assumed that all that was required in the way of a tapping attachment was a simple rigid or soled tapping attachment or tap holder, and the CNC machines would do the rest. In fact, early in the process the machine builders recommended that solid rigid tap holders be used. Eventually rigid tapping has become the preferred and predominant way of cutting or tapping internally threaded holes.

Eventually some companies began to recognize the need to soften up the rigid tapping attachments while still maintaining the rigidness required by these applications. The industry knew the old tension/compression tapping attachments would not work in the new CNC applications and therefore began to use and develop plastic dampeners and O-rings to slightly soften the rigid tapping while still maintaining the rigidness required for rigid body tapping.

In machining numerous internally threaded apertures, one machine may be used to drill pilot holes into which the taps are driven, while a different machine may be used for the actual tapping. This may lead to slight positioning errors wherein the tap for instance is not exactly aligned with the pilot hole, but instead may be one or two thousandths of an inch off.

Some tapping attachments utilize a threaded adjusting screw to position the tap within the tapping attachment, and this adjusting screw allows the vertical adjustment of the tap relative to the tapping attachment. It has also been found that when the collet is tightened to secure the tap, it tends to want to draw the tap back up into the tapping attachment, which in turn can cause damage to the adjusting screw which has heretofor typically been fixed within the tapping attachment. It is an object of some embodiments of this invention to provide internal compressibility within the tapping attachment so that when the collet is tightened damage is minimized or avoided.

It will be appreciated by those of ordinary skill in the art that there is a need for a tap driver which has some limited flexure in the body of the tap driver for the location errors associated with locating the tap with respect to the desired tap hole location.

To achieve the precision and consistency of the flexure, it will also be appreciated by those of ordinary skill in the art that parts and materials for those components which can form an integrated part of the central body portion of the tap driver body can be very expensive. It is therefore an object of this invention to provide a tap driver system which minimizes the material needed for the flexure component to maintain a precise defined flexure.

Such a system as designed in some embodiments of the invention has an advantage of allowing the flexure component to be utilized in more than one type of tap driver if desired (for ease of manufacture and replacement, among other reasons). It is therefore another object of some embodiments of this invention to provide a universal central body portion or configuration which may be utilized in a plurality of different tap driver types, such as in a high pressure internal coolant, a cylindrical shank version, and/or a minimum quantity lubrication, to name a few.

It is also an object of some embodiments of this invention to provide a system to more easily interchange or replace flexure components within the tapping attachment. Some embodiments of this invention include a retaining ring which may be snapped into place around part or all of the flexure to fix it in its location within the tapping attachment. In these embodiments this would result in the flexure component, although it is of a different material, being integral with the other components of the tap driver body portion.

Other objects, features, and advantages of this invention will appear from the specification, claims, and accompanying drawings which form a part hereof. In carrying out the objects of this invention, it is to be understood that its essential features are susceptible to change in design and structural arrangement, with only one practical and preferred embodiment being illustrated in the accompanying drawings, as required.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

Figure 1:
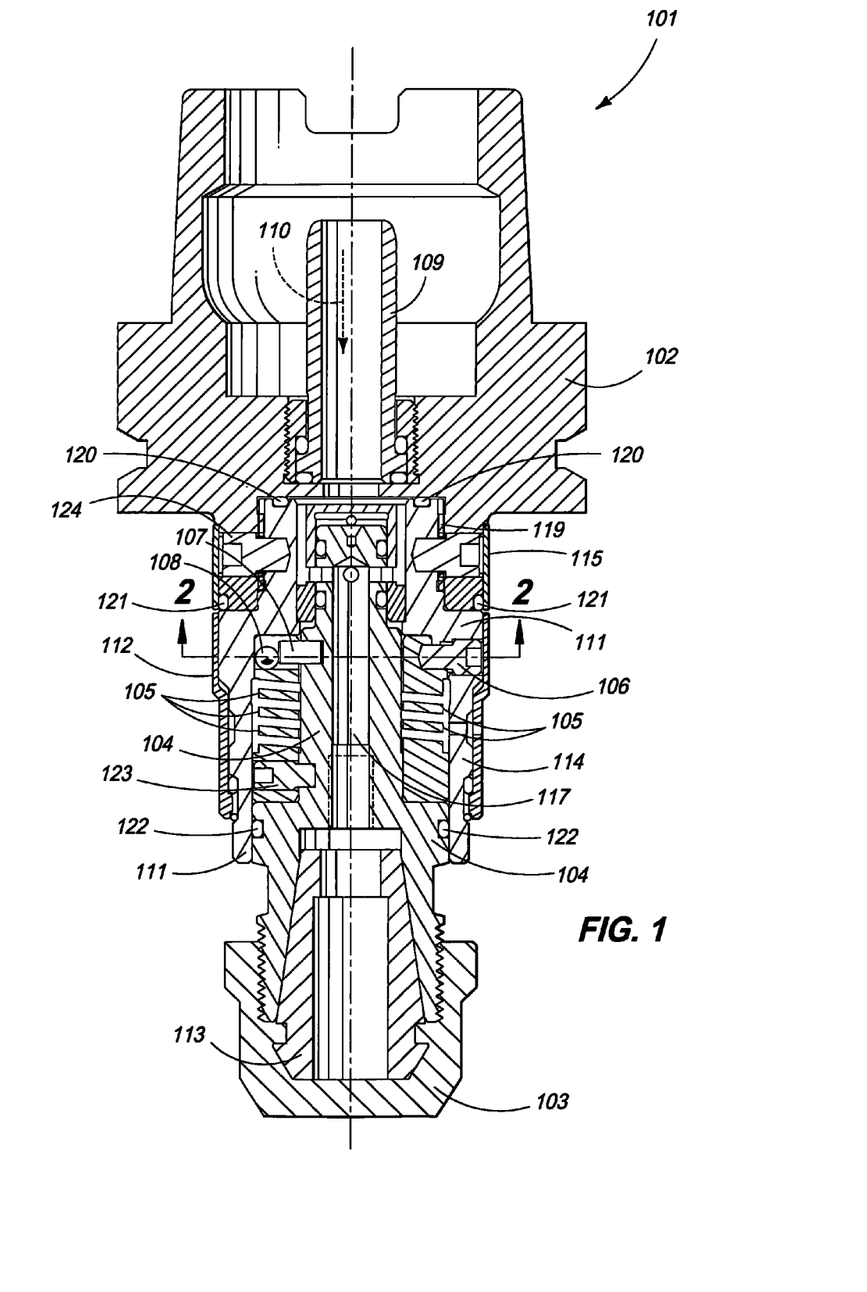
FIG. 1 is a cross-section elevation view of one example of an embodiment of a tap driver contemplated by this invention, illustrating a high pressure internal coolant tap driver.
Figure 4:
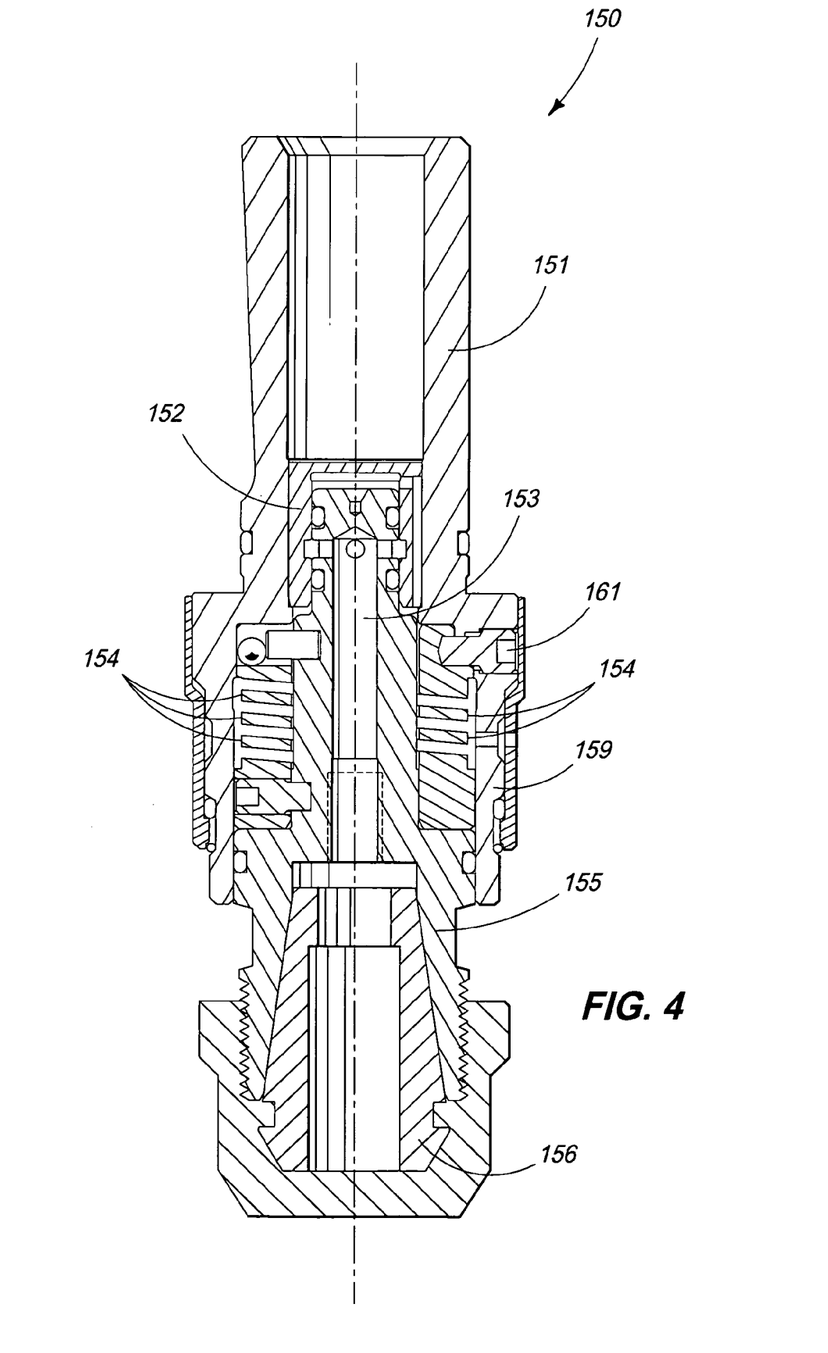
FIG. 4 is an elevation view of another example of an embodiment contemplated by this invention, illustrating a cylindrical shank version or type of a tap driver or tapping attachment.
Figure 9:
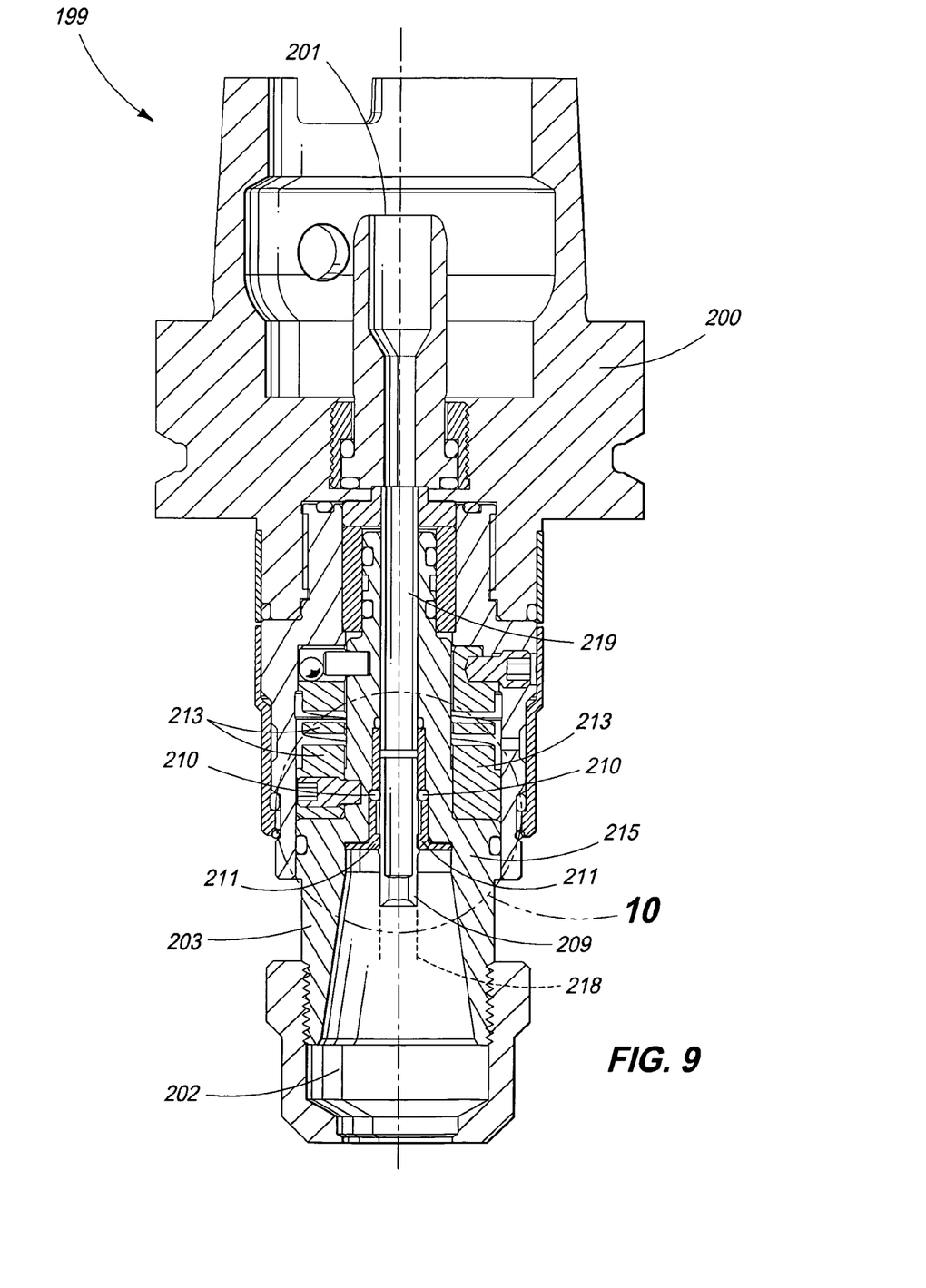
FIG. 9 is an elevation cross-sectional view of another embodiment of this invention illustrating one alternative for providing compressibility of the threaded adjusting screw which sets a tapping length of the tapping attachment in a minimum quantity lubrication type of tapping attachment.

In one overall embodiment of this invention, the same central body portion of a tap driver body may be made universal and that same flexure component may be utilized in a tap driver for a high pressure internal coolant tap driver as illustrated in FIG. 1, for a minimum quantity lubrication type of tap driver (such as shown in FIG. 9) and/or a cylindrical shank version of a tap driver (one example of which is shown in FIG. 4) which may also include high-pressure coolant. It is generally preferable to easily but securely integrate the flexure component and it will be appreciated by those of ordinary skill in the art that this is not necessarily limited to one mechanism as the preferred embodiment is illustrated and described herein. For example in one embodiment three set screws may be utilized to integrate the flexure component, while in other embodiments a retaining ring may be used in others. These are merely two examples or embodiments.

The universal nature of the flexure component and the ability to use it in combination with numerous different types of shanks and tapping attachments will be appreciated by those of ordinary skill in the art in reference to the embodiments illustrated in figures described below. However it should be noted that while some examples or embodiments are shown and described below, this invention or system may be utilized with or in combination of any one of a number of other shank types or tap holding configurations. Possible shanks include without limitation, those recognized as the ISO taper, CAT, the HSK shank, the Capto shank, BT shank, the ABS shank, the KM shank and others, all within the contemplation of this invention. The drawings illustrate a steel collet tap holding chuck, but other tap holding configurations may also be employed in varying combinations with the different shanks. Other tap holding configurations include without limitation other steel collet chucks or quick change tap adapter chucks.

Figure 6:
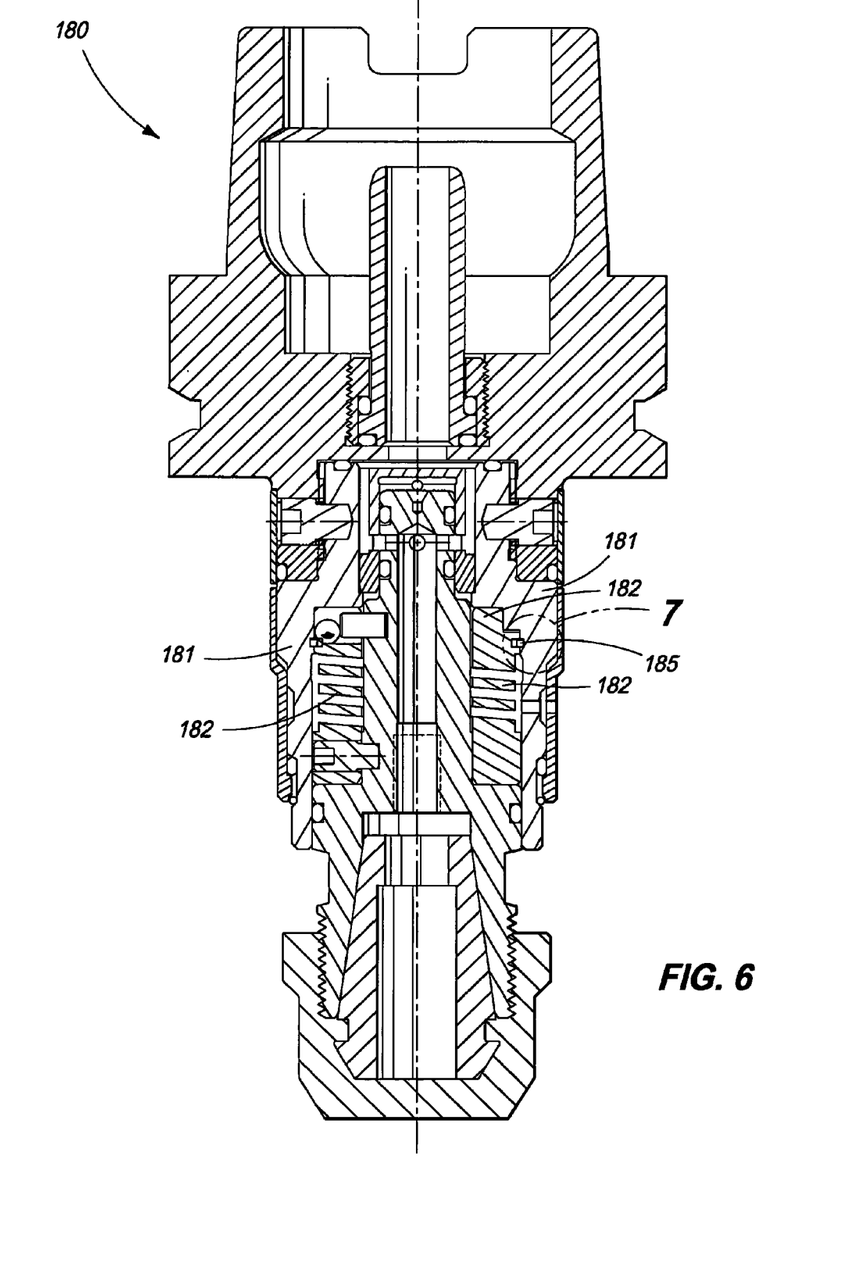
FIG. 6 is an elevation cross-section view of another embodiment contemplated by this invention, illustrating the flexure component integrated with the other tap driver body components by a permanent or semi-permanent retaining ring in a high pressure internal coolant type of tapping attachment.

To further illustrate the universal nature of the flexure component as well as the ability to utilize the same flexure component in combination with different types of tap holding configurations and shanks: FIG. 1 illustrates flexure component 105 used in a high pressure internal coolant tapping attachment; FIG. 4 shows flexure component 154 (which is the same as flexure component 105 in FIG. 1) utilized in a cylindrical shank tap driver; FIG. 6 illustrates flexure component 182 (which is the same as flexure component's 105 and 154) utilized in a different embodiment of a high-pressure coolant tap driver; and FIG. 9 illustrates the use of what can be the same flexure component 213 in a minimum quantity lubricant tap driver 199.

Figure 3:
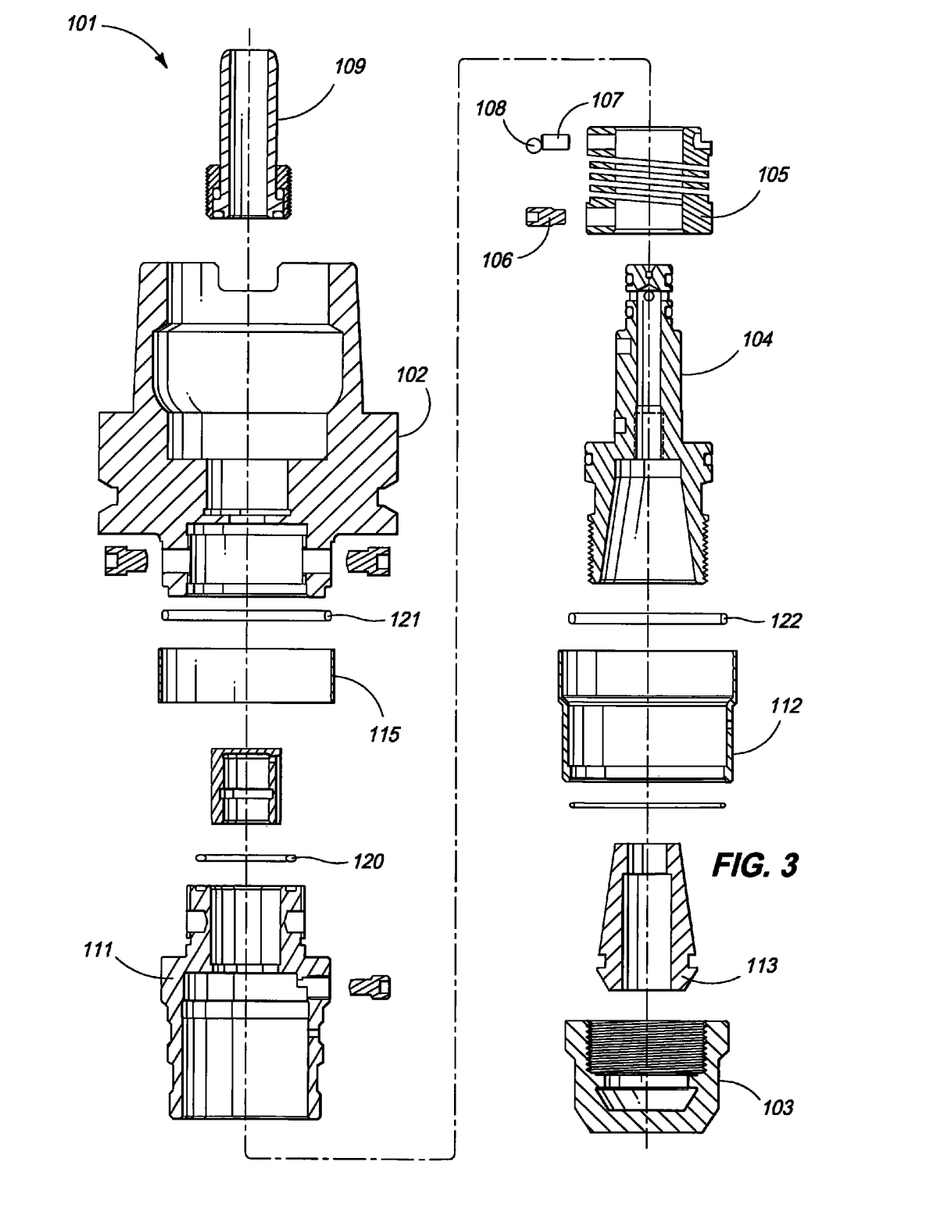
FIG. 3 is an exploded elevation view of the high pressure internal coolant tap driver illustrated in FIG. 1.
Figure 5A:
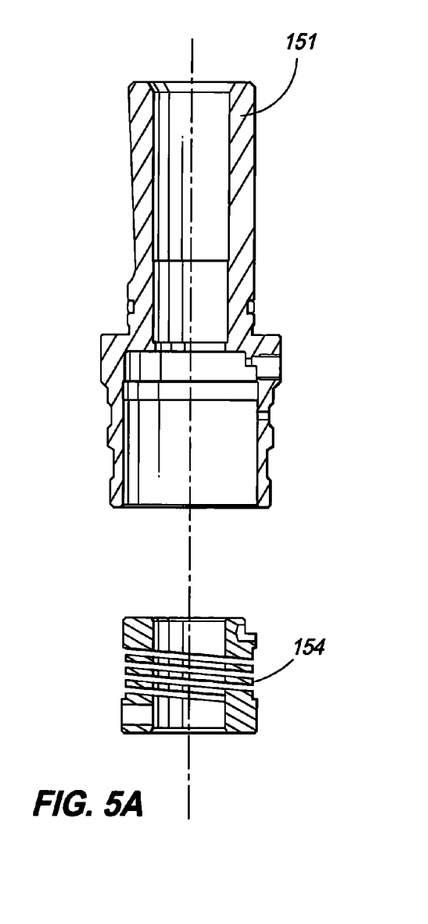
FIG. 5A is a partial exploded elevation view of a cylindrical shank version tap driver.
Figure 5B:
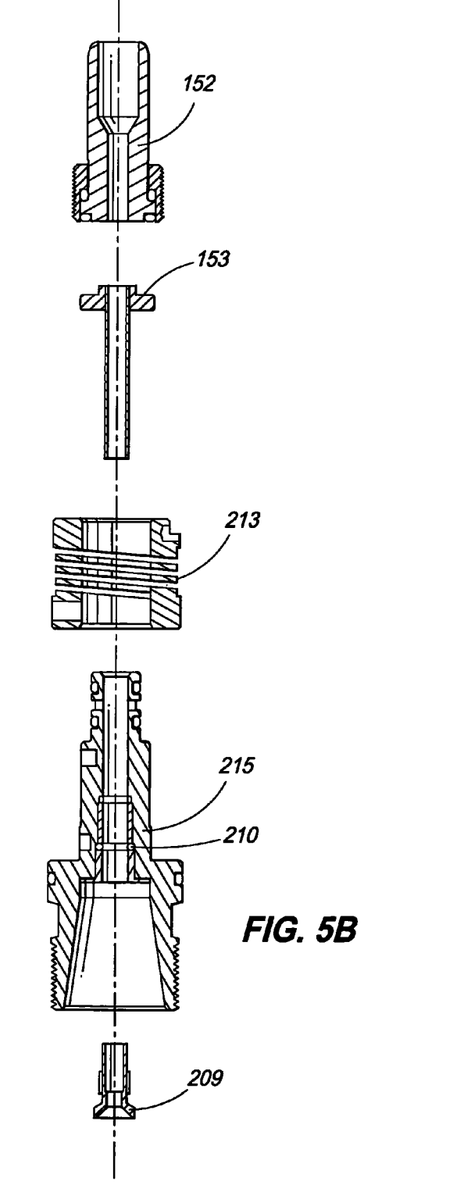
FIG. 5B is a partial exploded elevation view of a minimum quantity lubrication tap driver.

Furthermore, the exploded view in FIG. 3 illustrates flexure component 105 as it fits within or relative to the components of the high-pressure coolant tap driver 101; and FIG. 5 illustrates a exploded view showing flexure component 154 as it fits within and relative to the components of a cylindrical shank tap driver 150; and FIG. 5 also shows an exploded view of a flexure component 213.

FIG. 1 is a cross-section elevation view of one example of an embodiment of a tap driver contemplated by this invention, illustrating a high pressure internal coolant tap driver. FIG. 1 illustrates tap driver 101, flexure 105, shank portion 102, high-pressure coolant conduit 109 with arrow 110 illustrating the flow direction of high-pressure coolant, central body housing 114, upper high pressure coolant conduit 109, coolant flow conduit 117, chuck portions 103 and 104, collet portion 113, sleeve 115, shank portion 102, housing 111, outer sleeve 112, and O-rings 120, 121 & 122. It will be appreciated that while the shank portion 102 illustrates an integral HSK shank, others may also be utilized for different embodiments of this invention, all within the contemplation of this invention. The flexure component 105 is attached to the chuck portion 104 via screw pins 123 and drive pins 107 partially positioned by bearings 108.

FIG. 1 further illustrates one way of integrating the flexure component 105 to the housing 111 utilizing three set screws 106 and one way of fixing the shank portion 102 to the housing via thread and pin 119 and 124.

Figure 2:
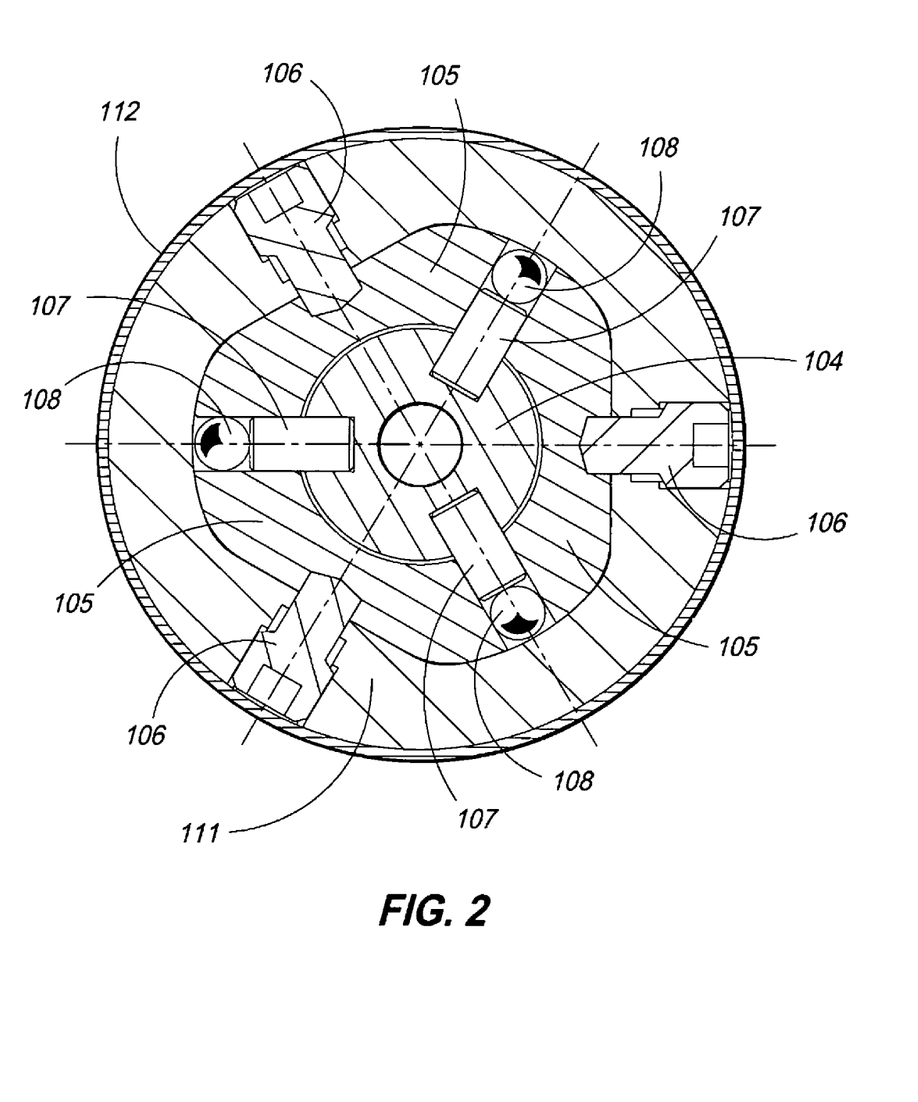
FIG. 2 is cross-sectional view 2-2 from the embodiment of the invention illustrated in FIG. 1.

FIG. 2 is a cross-sectional view 2-2 from the embodiment of the invention illustrated in FIG. 1 and illustrates how the flexure component 105 body is fixed to the housing 111 utilizing a polygonal fit and three screw pins 106. This configuration results in a flexure component 105 integral with the body housing 111 which thereby provides interaction in the rotational direction to accomplish the driving while still providing the vertical flexure through the flexure component 105. The flexure component 105 is attached to the chuck portion 104 via screw pins 123 (FIG. 1) and drive pins 107 partially positioned by bearings 108.

FIG. 3 is an exploded elevation view of the high pressure internal coolant tap driver illustrated in FIG. 1. Like numbered components are the same as described in FIG. 1 and will not be described in detail here. FIG. 3 does however show flexure component 105 which may be utilized universally such that it may be the same as flexure component 154 as shown in FIG. 4, flexure component 213 as shown in FIG. 5, flexure component 182 as shown in FIG. 6, and flexure component 213 as shown in FIG. 9.

FIG. 4 is an elevation view of another example of an embodiment contemplated by this invention, illustrating a cylindrical shank version of a tap driver 150, illustrating shank portion 151, flexure component 154, chuck portion 155 and collet 156, set screw 161 for attaching flexure component 154 to housing 159. The embodiment of the cylindrical shank version of the tap driver 150 illustrated in FIG. 4 may be included with a high-pressure coolant, such as partially reflected by flow areas 152 and 153.

It will be noted that for the cylindrical shank version or embodiment of the invention shown with the high-pressure coolant in FIG. 4, pretty much all the same parts within a given size range may be used, except for the housing.

FIGS. 5A and 5B illustrate how the flexure component 154 in particular may be utilized to provide flexure integrated into the central portion of the tap driver body for more than one type of tap driver, with FIG. 5A showing the flexure component 154 exploded relative to a cylindrical shank tap driver housing 151 and FIG. 5B illustrating the same flexure component 213 being utilized in a minimum quantity lubrication system type of tap arrangement (such as is shown and described in connection with FIG. 9).

FIG. 5A is an exploded elevation view of the cylindrical shank version tap driver illustrated in FIG. 4, and illustrates the flexure component 154 exploded relative to the shank portion of a cylindrical shank tap driver 151.

FIG. 5B is an exploded elevation view illustrating the flexure component 213 in an exploded elevation view arrangement relative to components of a minimum quantity lubrication system, including chuck 215 with O-ring 210, adjusting screw 209, flexure component 213, lubrication tube 153 and inlet portion 152 of the minimum quantity lubrication system. It will be appreciated by those of ordinary skill in the art that there are limitations to the ability to use the same flexure component 213 (or alternative 154) for example on different types or sizes of tap drivers as this will be workable or more desirable for tap drivers within a particular size range of the tap driver.

FIG. 6 is an elevation cross-section view of another embodiment contemplated by this invention, illustrating the flexure component 182 integrated with the other tap driver body components by a permanent or semi-permanent retaining ring in a high pressure internal coolant type of tapping attachment. The retaining ring 185 is merely a different way to secure or integrate the flexure component 182 relative to the housing 181. From a rotational or drive perspective, a polygonal shape such as illustrated in FIG. 2 may still be utilized to provide the drive in a rotational direction and the retaining ring 185 would provide and secure or attach the vertical location of the flexure component 182 relative to the housing 181. The retaining ring 185 configuration is an alternative to the screws 106 illustrated in FIGS. 1 & 2.

Figure 7:
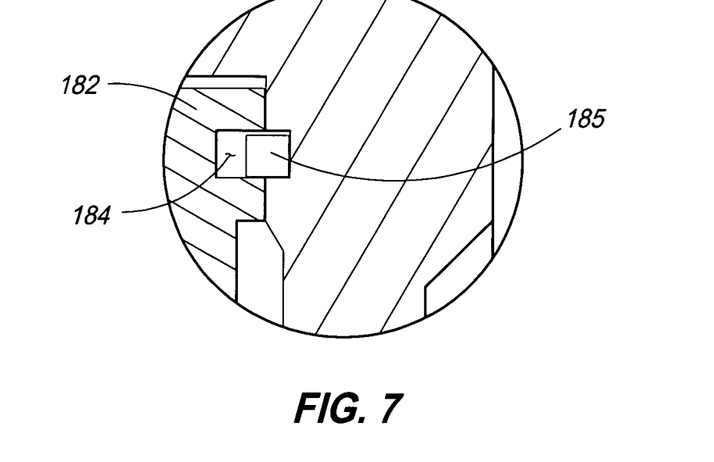
FIG. 7 is one embodiment that may be utilized as the retaining ring from Detail 7 in FIG. 6.

FIG. 7 is one embodiment that may be utilized as the retaining ring from Detail 7 in FIG. 6; illustrating a square wire type of retaining ring 185 which would encircle flexure component 182 and be located within retaining ring aperture 184. The outward bias or spring of retaining ring 185 would, in combination with its width, cause it to span between the retaining ring aperture 184 within both the flexure component 182 and the housing 181. It will be appreciated by those of ordinary skill in the art that once the embodiment of the retaining ring illustrated in FIGS. 7 & 8 is installed, it is a permanent or semi-permanent integration of the flexure component 182 in the housing 181 due to the difficult nature of removing the retaining ring from between the two.

Figure 8:
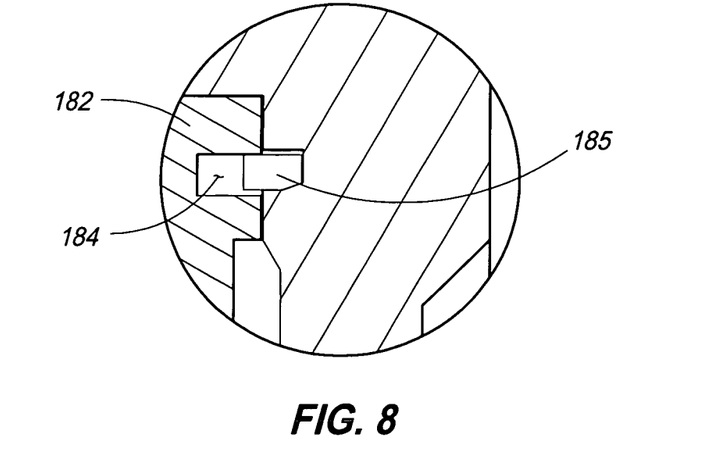
FIG. 8 is another embodiment that may be utilized as the retaining ring from Detail 7 in FIG. 6.

FIG. 8 is another embodiment that may be utilized as retaining ring from Detail 7 in FIG. 6, illustrating a slightly different retaining ring 185 configuration detail, wherein the retaining ring is instead a wedge ring which may in some embodiments be utilized to eliminate play or movement between the flexure component 182 and the housing 181. It will be appreciated by those of ordinary skill in the art that no one particular type of retaining ring or means of securely fixing the flexure component 182 relative to the housing 181 is required to practice this invention, but instead any one of a number of different mechanical and other techniques and components may be utilized within the contemplation of this invention.

FIG. 9 is an elevation cross-sectional view of another embodiment of this invention 199, illustrating one alternative for providing compressibility of the threaded adjusting screw 209 which sets a tapping length of the tapping attachment in the exemplary minimum quantity lubrication type of tapping attachment. Generally when providing quality tapping attachments and components to users and manufacturers, it is desirable to set and be able to reset the tapping length to meet the requirements of the application. Generally a tapping adjustment screw 209 configuration is utilized to provide the adjustability.

FIG. 9 illustrates minimum quantity lubrication shank portion 200, flexure component 213, O-ring 210, chuck portion 215, collet receiving portion 202 and other common components of a minimum quantity lubrication tapping attachment.

However in some applications when the collet is tightened to secure the tapping tool into the tapping attachment, it may tend to draw or push the tap into the adjusting screw 209 and can cause damage to the adjusting screw. It is therefore desirable to provide some slight compressibility to avoid damage and FIG. 9 illustrates one way to accomplish this. FIG. 9 illustrates the application of this in a minimum quantity lubrication tapping attachment. Minimum quantity lubrication enters at location 201 and conduit 219 provides a straight passage for air and lubricant to be delivered to the back of the tap. The threaded adjusting screw 209 would typically contact the back of the tap 218 to provide a mechanism to set the length of the tap.

Figure 10:
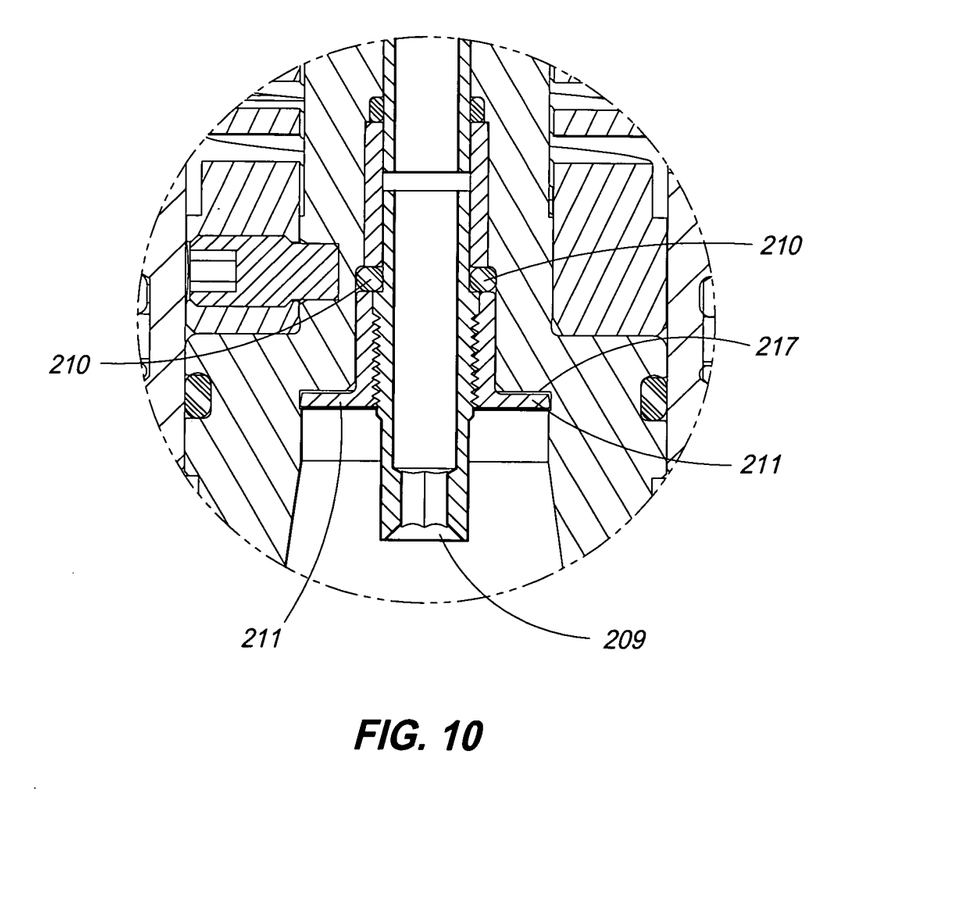
FIG. 10 is Detail 10 from FIG. 9 showing one alternative embodiment.

FIG. 10 is Detail 10 from FIG. 9 showing one alternative embodiment for providing compressibility through the threaded adjusting screw 209. In FIG. 10, the internal thread for the adjusting screw which snaps into place in the spindle groove and is able to compress slightly against the O-ring 210 when the collet is tightened. A slight gap 217 may be provided to allow you compressibility of the O-ring to be utilized for the compressibility. This configuration allows the damage which may be incurred to be avoided when the collet is tightened and tends to draw the tap back in such a way that it may damage the adjusting screw.

As will be appreciated by those of reasonable skill in the art, there are numerous embodiments to this invention, and variations of elements and components which may be used, all within the scope of this invention. In one embodiment for example.

In addition to the embodiment disclosed in the preceding paragraph, the invention may further include: a tap driver for rigid or synchronous tapping, with a tap driver body comprising: a shank portion at a first end of the tap driver body, the shank portion configured to be secured to a tapping machine; a chuck portion at a second end of the tap driver; and a central body portion between the shank portion and the chuck portion, the central body portion including a housing and a corresponding non-circular flexure component fitted therein, the flexure component being integrated with the housing and having a defined compressibility.

In addition to the tap driver for rigid or synchronous tapping as recited in the preceding paragraph, the tap driver may be further wherein the flexure component is integrated with the central body portion housing by at least one fastener between the flexure component and the central body portion housing or further wherein the flexure component is integrated with the central body portion housing by a slip ring positioned in a slip ring aperture in and between the flexure component and the central body portion housing.

In addition to the tap driver for rigid or synchronous tapping as recited in the second preceding paragraph, the tap driver may be further wherein the shank portion of the tap driver attached to the central body portion may be either a minimum quantity lubrication type, a high-pressure internal coolant type or a cylindrical shank type and/or still further wherein the minimum quantity lubrication type shank portion, the high-pressure internal coolant type shank portion and the cylindrical shank type shank portion are interchangeable.

In addition to the tap driver for rigid or synchronous tapping as recited in the third preceding paragraph, the tap driver may be further wherein the tap driver includes a threaded tap adjusting screw threadably inserted into a threaded screw aperture in the chuck portion of the tap driver which is compressible; and still further wherein the threaded screw aperture is mounted to the chuck portion of the tap driver with a compressible abutment between the threaded screw aperture and the chuck portion configured to compress when a collet on the chuck portion tightens a tap therein.

In yet another embodiment of this invention, universal tap driver flexure system for rigid tapping may be provided which includes: a tap driver body comprising: a first shank portion at a first end of the tap driver body, the first shank portion configured to be secured to a tapping machine; a chuck portion at a second end of the tap driver; and a central body portion between the first shank portion and the chuck portion, the central body portion including a housing and a non-circular flexure component fitted therein, the flexure component having a defined compressibility; and a second shank portion interchangeable with the first shank portion and attachable to the central body portion.

In addition to the embodiment disclosed in the preceding paragraph, the universal tap driver flexure system for rigid tapping may be further wherein the first shank portion is one of a minimum quantity lubrication type, a high-pressure internal coolant type or a cylindrical shank type, and the second shank portion is a different one of the minimum quantity lubrication type, the high-pressure internal coolant type or the cylindrical shank type.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A tap driver for rigid or synchronous tapping, comprising:
    (a) a tap driver body comprising:
        a shank portion at a first end of the tap driver body, the shank portion configured to be secured to a tapping machine;
        a chuck portion at a second end of the tap driver; and
        a central body portion between the shank portion and the chuck portion, the central body portion including a housing and a corresponding non-circular flexure component fitted therein, the flexure component being integrated with the housing and having a defined compressibility.

2. A tap driver for rigid or synchronous tapping as recited in claim 1 and further wherein the flexure component is integrated with the central body portion housing by at least one fastener between the flexure component and the central body portion housing.

3. A tap driver for rigid or synchronous tapping as recited in claim 1 and further wherein the flexure component is integrated with the central body portion housing by a slip ring positioned in a slip ring aperture in and between the flexure component and the central body portion housing.

4. A tap driver for rigid or synchronous tapping as recited in claim 1 and further wherein the shank portion of the tap driver attached to the central body portion may be either a minimum quantity lubrication type, a high-pressure internal coolant type or a cylindrical shank type.

5. A tap driver for rigid or synchronous tapping as recited in claim 4 and further wherein the minimum quantity lubrication type shank portion, the high-pressure internal coolant type shank portion and the cylindrical shank type shank portion are interchangeable.

6. A tap driver for rigid or synchronous tapping as recited in claim 1 and further wherein the tap driver includes a threaded tap adjusting screw threadably inserted into a threaded screw aperture in the chuck portion of the tap driver which is compressible.

7. A tap driver for rigid or synchronous tapping as recited in claim 6 and further wherein the threaded screw aperture is mounted to the chuck portion of the tap driver with a compressible abutment between the threaded screw aperture and the chuck portion configured to compress when a collet on the chuck portion tightens a tap therein.

8. A universal tap driver flexure system for rigid tapping comprising:
 (a) a tap driver body comprising:
  a first shank portion at a first end of the tap driver body, the first shank portion configured to be secured to a tapping machine;
  a chuck portion at a second end of the tap driver; and
  a central body portion between the first shank portion and the chuck portion, the central body portion including a housing and a non-circular flexure component fitted therein, the flexure component having a defined compressibility; and
  a second shank portion interchangeable with the first shank portion and attachable to the central body portion.

9. A universal tap driver flexure system for rigid tapping as recited in claim 8, and further wherein the first shank portion is one of a minimum quantity lubrication type, a high-pressure internal coolant type or a cylindrical shank type, and the second shank portion is a different one of the minimum quantity lubrication type, the high-pressure internal coolant type or the cylindrical shank type.

\* \* \* \* \*